United States Patent
Kopplin et al.

(10) Patent No.: US 10,252,305 B2
(45) Date of Patent: Apr. 9, 2019

(54) FLAT PRODUCT MADE OF A METAL MATERIAL AND ROLL AND METHOD FOR PRODUCING SUCH FLAT PRODUCTS

(71) Applicants: Daetwyler Graphics AG, Bleienbach (CH); ThyssenKrupp Steel Europe AG, Duisburg (DE)

(72) Inventors: Karl-Heinz Kopplin, Essen (DE); Martin Koch, Neukirchen-Vluyn (DE); Stefan Wischmann, Berlin (DE); Friedhelm Macherey, Alpen (DE); Folkert Schulze-Kraasch, Duisburg (DE); Jörg Wahser, Duisburg (DE); Guido Hennig, Kappel (CH); Markus Resing, Vreden (DE)

(73) Assignees: Daetwyler Graphics AG, Bleienbach (CH); ThyssenKrupp Steel Europe AG, Duisburg (DE)

( * ) Notice: Subject to any disclaimer, the term of this patent is extended or adjusted under 35 U.S.C. 154(b) by 395 days.

(21) Appl. No.: 14/426,499

(22) PCT Filed: Sep. 9, 2013

(86) PCT No.: PCT/EP2013/068542
§ 371 (c)(1),
(2) Date: Mar. 6, 2015

(87) PCT Pub. No.: WO2014/037545
PCT Pub. Date: Mar. 13, 2014

(65) Prior Publication Data
US 2015/0209848 A1    Jul. 30, 2015

(30) Foreign Application Priority Data
Sep. 7, 2012    (DE) ........................ 10 2012 017 703

(51) Int. Cl.
B21B 1/22    (2006.01)
B21B 27/00    (2006.01)
(Continued)

(52) U.S. Cl.
CPC ............ B21B 1/227 (2013.01); B21B 27/005 (2013.01); B23K 26/0622 (2015.10);
(Continued)

(58) Field of Classification Search
CPC ... B21B 1/227; B21B 2267/10; B21B 27/005; B23K 2203/0084; B23K 26/0622;
(Continued)

(56) References Cited

U.S. PATENT DOCUMENTS 4,795,681 A    1/1989    Furukawa et al.
4,806,731 A    2/1989    Bragard et al.
(Continued)

FOREIGN PATENT DOCUMENTS

CN    1394239 A    1/2003
CN    101707928 A    5/2010
(Continued)

OTHER PUBLICATIONS

NPL-English translation of JP-S63050488 from IDS Translated May 2017.*
(Continued)

Primary Examiner — David Sample
Assistant Examiner — Elizabeth Collister
(74) Attorney, Agent, or Firm — The Webb Law Firm

(57) ABSTRACT

A flat product made of a metal material has been provided with deterministic surface texture which has a plurality of depressions which have a depth in the range of from 2 to 14 μm, wherein the depressions are designed to be I-shaped, H-shaped, cross-shaped, C-shaped or X-shaped, and wherein the surface texture has a peak count RPc in the
(Continued)

range of from 45 to 180 1/cm, an arithmetic mean roughness Ra in the range of from 0.3 to 3.6 µm, and an arithmetic mean waviness Wsa in the range of from 0.05 to 0.65 µm. A roll which is particularly suitable for producing such a flat product has a deterministic surface texture which has a plurality of overlapping dimples, which are arranged such that they delimit a double-I-shaped, H-shaped, cross-shaped, C-shaped or X-shaped material texture in the roll surface, and wherein the surface texture of the roll, measured in the direction of the roll axis, is characterized by a peak count RPc in the range of from 80 to 180 1/cm, an arithmetic mean roughness Ra in the range of from 2.5 to 3.5 µm and an arithmetic mean waviness Wsa in the range of from 0.08 to 1.0 µm.

18 Claims, 6 Drawing Sheets

(51) Int. Cl.
*B23K 26/08* (2014.01)
*B23K 26/0622* (2014.01)
*B23K 26/352* (2014.01)
*B23K 101/20* (2006.01)
*B23K 103/04* (2006.01)

(52) U.S. Cl.
CPC ........ *B23K 26/0823* (2013.01); *B23K 26/355* (2018.08); *B21B 2267/10* (2013.01); *B23K 2101/20* (2018.08); *B23K 2103/04* (2018.08); *Y10T 428/12799* (2015.01); *Y10T 428/12993* (2015.01)

(58) Field of Classification Search
CPC ............ B23K 26/0823; B23K 2201/20; B23K 2203/04; B23K 26/0084; Y10T 428/12799; Y10T 428/12993
USPC ...... 428/28, 30, 31, 36, 603; 492/30, 31, 33, 492/34, 35, 36, 37; 72/199, 336.2; 101/3.1

See application file for complete search history.

(56) References Cited

U.S. PATENT DOCUMENTS

| | | | |
|---|---|---|---|
| 4,959,275 | A | * 9/1990 | Iguchi ................. B21B 27/005 101/32 |
| 6,797,411 | B2 | 9/2004 | Sodani et al. |
| 8,920,938 | B2 | 12/2014 | Hesse et al. |
| 2004/0035176 | A1 | 2/2004 | Haase et al. |

FOREIGN PATENT DOCUMENTS

| | | | |
|---|---|---|---|
| DE | 4102983 | A1 | 4/1992 |
| DE | 10221515 | C1 | 11/2003 |
| DE | 102010028183 | A1 | 10/2011 |
| EP | 2006037 | B1 | 8/2010 |
| JP | 62230402 | A | 10/1987 |
| JP | 6350488 | A | 3/1988 |
| JP | 1293907 | A | 11/1989 |
| JP | 5192701 | A | 8/1993 |
| JP | 07009015 | A * | 1/1995 |
| JP | 890003 | A | 4/1996 |
| JP | 2000176513 | A | 6/2000 |
| SU | 1560337 | A1 | 4/1990 |
| WO | 9507775 | A1 | 3/1995 |

OTHER PUBLICATIONS

Machine tranclation of Onda et al. (JP 07-009015) (Year: 1995).*
Sheers et al., Assessment of Steel Surface Roughness and Waviness in Realtion with Paint Appearance, Int. J. Mach. Tools Manufact., vol. 38 (No. 5-6) , 1998, pp. 647-656 (Year: 1998).*
Zimnik et al., "Pretex—Ein neues Verfahren zur erzeugung texturierter Feinbleche für höchste Ansprüche," Stahl und Eisen, (1998), pp. 75-80, vol. 118 Nr. 3.

* cited by examiner

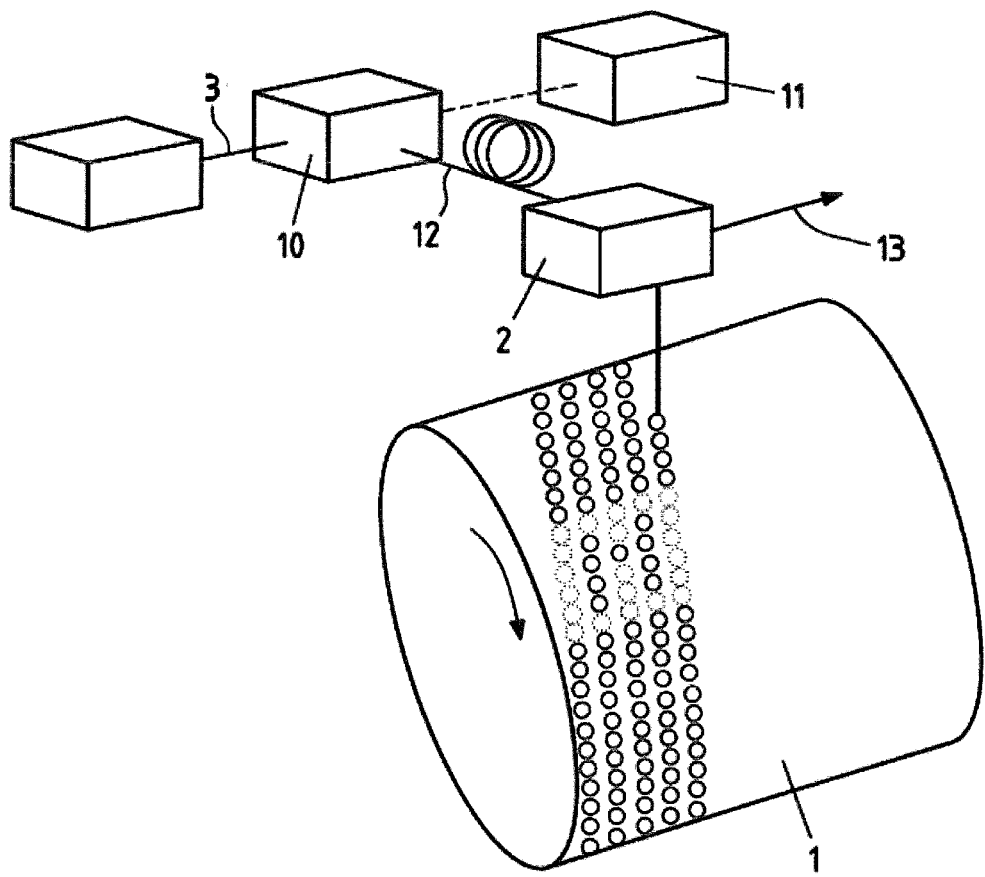
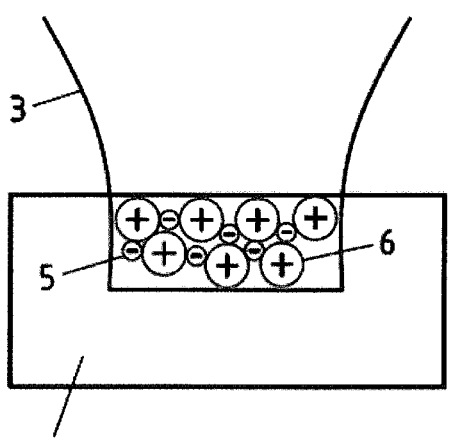
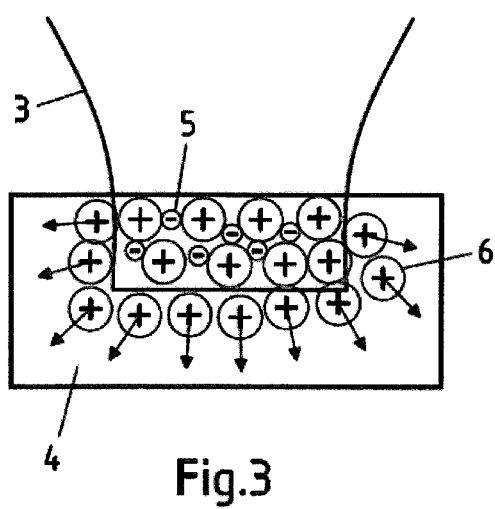

Gaussian profile

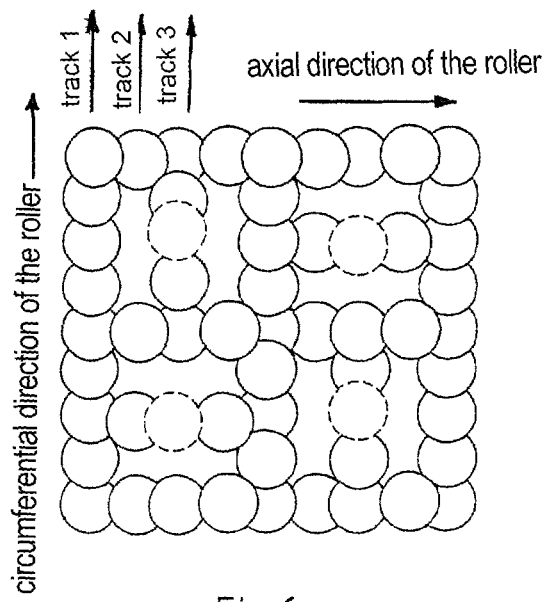
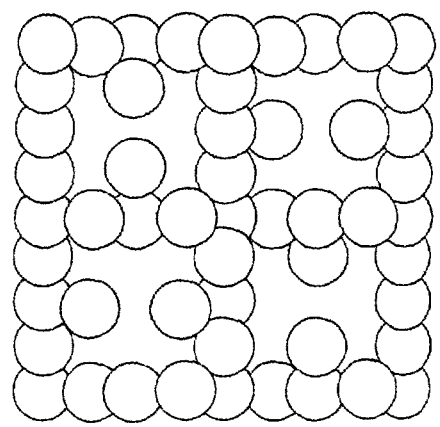
Fig.6                                   Fig.7
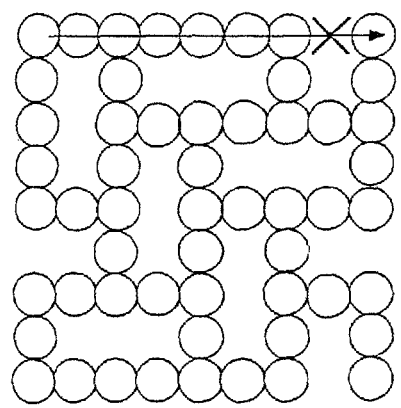
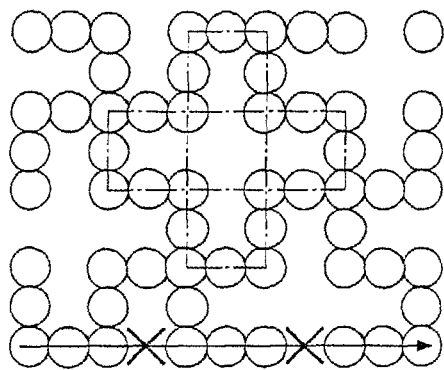
Fig.8                                   Fig.9

FLAT PRODUCT MADE OF A METAL MATERIAL AND ROLL AND METHOD FOR PRODUCING SUCH FLAT PRODUCTS

CROSS-REFERENCE TO RELATED APPLICATIONS

This application is the United States national phase of International Application No. PCT/EP2013/068542 filed Sep. 9, 2013, and claims priority to German Patent Application No. 10 2012 017 703.8 filed Sep. 7, 2012, the disclosures of which are hereby incorporated in their entirety by reference.

BACKGROUND OF THE INVENTION

Field of the Invention

The invention relates to a flat product made of a metal material, in particular a steel material, to an advantageous use and to a roll which is particularly suitable for producing such a flat product, and to a method for producing flat products of this type. "Flat products" in this context are understood to mean sheets which are produced from a metal or a metal alloy, in particular thin sheets, or strips and other rolled products produced in comparable ways.

Description of Related Art

Flat products of the type discussed here are used to produce components which are subsequently coated with one or more paint layers, in order to protect them from possible corrosion and to optimise their visual appearance. The quality of the visual appearance is judged in this case inter alia by how far the surface texture of the respective sheet metal substrate affects the surface of the paint coating.

Particularly high demands are placed on the appearance of the surfaces of automotive body parts which are visible from the outside. In practice, said demands are met by applying multilayer paint systems. Said paint systems conventionally comprise at least one "filler layer", which is used in particular to correct any irregularities which are present on the surface to be coated.

The expense associated with the application of multilayer paint systems to sheet metal is considerable. In order to reduce said expense and thereby reduce the process costs, paint methods have been developed which do not require a "filler layer". These current paint methods are being used more and more in the automotive industry. Since the total layer thickness of the paint structure is substantially reduced in such cases, the demands on the surface quality of the sheet metal used for this purpose increase in order to ensure that irregularities in the surface of the sheet metal do not show up in the paint topcoat.

A further criterion when assessing the suitability of a metal flat product for producing car body components is the behaviour thereof when it is formed into the respective components. Said behaviour is also dependent on the surface texture of the respective flat products. Thus, for example during deep-drawing, depressions which are present in the surface of a metal sheet form what are known as lubricant pockets, in which a lubricant which is applied to the metal sheet before the forming thereof or is injected into the forming die can accumulate. The load-bearing capacity of the lubricating film formed by the lubricant in this case depends on the design and distribution of these depressions.

There are various proposals to texture the surfaces of metal sheets in such a way that, after painting, they have an optimised appearance. For example, JP-A-63-50488 and JP-A-1-293907 propose producing regular surface textures which comprise cylindrical, punch-type elevations, which are each encircled by a groove-shaped depression and project from an otherwise planar surface.

According to JP-A-63-50488, the plateaus of the elevations are located approximately 2-10 μm above the floors of the valley regions which are present between the elevations. At the same time, the combined percentage of the planar plateaus of the peaks and the planar surfaces of the average flat regions which are present between the floors of the valleys and the peak plateaus is 20-90% of the total surface area. In order to produce this surface texture, a skin-pass roll is used, the surface of which has been machined by means of a laser.

In JP-A-1-293907, it is required in addition that the percentage of flat regions which are present between the regularly arranged elevations having circular cross sections should occupy at least 85% of the sheet metal surface, that the depth of the valleys surrounding the elevations extending from the flat regions should be at least 4 μm and that, according to a frequency analysis of the sheet steel geometry, the intensity of the wavelength components of the wavelength A, which lie in a range of 585 μm<λ<2730 μm, is at most 0.6 μm².

The metal sheets which are produced according to the two above-mentioned Japanese patent applications are intended, in the painted state, to make an extremely vivid impression. However, these specified requirements presuppose deterministic surface textures. In particular, the high intensities which are permissible according to JP-A-1-293907, in the wavelength components specified in said document, only occur in the case of deterministic surface textures having a high periodicity.

In addition to skin-pass rolls which have deterministic surface textures, skin-pass rolls are also known which have stochastic surface textures. In order to produce such surface textures, inter alia the shot-blast method is used, in which method polygonal blasting shot made of chilled cast iron is flung against the roll surface of the rotating roll which is to be textured. The rough texture produced in this manner corresponds to a stochastic distribution of plastic individual deformations which transition into one another in the manner of a mountain range. However, the reproducibility of the shot-blast method is insufficient due to the spread of the process parameters being too great.

An additional method for producing textured thin metal sheets having a stochastic surface texture is disclosed by the publication "Stahl and Eisen" [Steel and iron] 118 (1998) No. 3, pages 75-80. In this case, the roll used to texture the thin metal sheets is coated with a wear-resistant chrome multilayer system in a closed reactor system. The rough texture of said chrome multilayer system is characterised by a relatively uniform, stochastic distribution of different sizes of hemisphere, which are transferred to the thin metal sheet during skin-passing in the form of corresponding dome-shaped impressions.

An additional method for producing textured flat products, in particular thin metal sheets having a stochastic surface texture, is disclosed by EP 2 006 037 B1. In this document, the roll used for texturing the thin metal sheets is textured by means of electrical discharge texturing (EDT). The starting state prior to texturing the roll should be a roll surface which has been ground smooth. Depressions are introduced into this surface by electrical discharge texturing so as to be as closely adjacent to one another as possible. The "webs" remaining between the depressions already have the desired same height as a result of the smooth starting state of the roll surface. During the EDT method, a defined voltage is temporarily, optionally periodically, applied between the electrode and the roll. Charge carriers (ions) are accelerated through the EDT channel from an electrolyte towards the roll surface. When they strike the roll surface, they remove roll material therefrom and produce a depression. The roll material removed and melted thereby is carried away by electrode rinsing and, as a result of the dielectric oil, is substantially unable to reconnect to the roll surface. However, in practice, roll material which is melted during the texturing process cannot be completely prevented from accumulating on the surface which was originally ground smooth. This material can be removed in a manner known per se by a precision grinding process.

However, using the methods for producing stochastic surface textures, it is not possible to produce microtextured surfaces such that characteristic values which meet the requirements for roughness and low long-waviness can be set independently of one another in order to avoid what is known as the "orange peel" effect.

In this context, the object of the present invention was to produce a flat product of the type mentioned at the outset, in particular having the defined oil absorption capacity, optimal formability and a good prerequisite for paint appearance, said product having an outstanding appearance even when the overall layer thickness of the paint structure is low when the painting is finished. In addition, a preferred use of such a flat product, a roll, which is particularly suitable for producing such a flat product, and a method for producing a flat product of this type should be indicated.

SUMMARY OF THE INVENTION

The flat product according to the invention is characterised by a deterministic surface texture which has a plurality of depressions which have a depth in the range of from 2 to 14 μm, the depressions being I-shaped, double-I-shaped, H-shaped, cross-shaped, C-shaped or X-shaped, and the surface texture having a peak count RPc in the range of from 45 to 180 1/cm, an arithmetic mean roughness Ra in the range of from 0.3 to 3.6 μm and an arithmetic mean waviness Wsa in the range of from 0.05 to 0.65 μm.

Preferred and advantageous embodiments of the flat product according to the invention are further indicated.

Correspondingly formed flat products have an optimised formability and an improved paint appearance if the depth of the depressions is preferably selected to be in the range between 3 and 13 μm. Extensive tests have shown that correspondingly designed thin metal sheets according to the invention have particularly good tribological properties (formability properties). The components produced from these thin metal sheets by forming were characterised by an outstanding paint appearance after typical automotive painting. An additional advantageous embodiment of the flat product according to the invention provides that the depressions have a closed, linear and/or curved design.

According to a preferred embodiment, the arithmetic mean roughness Ra of the surface texture of the flat product according to the invention lies in the range of from 1.0 to 2.5 μm, preferably in the range of from 1.0 to 2.0 μm, more preferably in the range of from 1.0 to 1.6 μm. Correspondingly formed metal flat products are characterised by very good tribological properties and, after typical automotive painting, result in an improved paint appearance by comparison with metal flat products from the prior art.

The very good paint appearance and tribological properties can be achieved in particular by a preferred embodiment of the invention, in which the depressions having a closed, linear and/or curved design are arranged relative to one another in a repeating pattern. For example, in the preferably deterministic surface texture, I-shaped depressions are arranged relative to one another in a herringbone pattern. A particularly advantageous embodiment of the flat product according to the invention with respect to the paint appearance and tribological properties is that the I-shaped depressions of the preferably deterministic surface texture are arranged such that they define a plurality of pairs which each consist for example of I-shaped depressions which extend parallel to one another.

An additional advantageous embodiment of the flat product according to the invention is characterised in that the pairs consisting of I-shaped depressions extending for example parallel to one another or the H-shaped depressions of the deterministic surface texture are arranged relative to one another in a chessboard pattern. Tests have shown that correspondingly designed thin metal sheets according to the invention have low abrasion in a typical forming process (deep-drawing process). The thin metal sheets according to the invention which are designed in this manner are characterised in particular by very low coefficients of friction, a very low and late tendency for what is known as the slip-stick effect, i.e. a quick change between static friction and sliding friction when determining the coefficient of friction, and very good formability properties in the case of adapted oiling volume, in particular in the case of deep-drawing strain. The predominantly closed empty volumes (lubricating oil pockets) in the thin metal sheet surface according to the invention demonstrated high stability even in the case of high forming forces.

The surface texture produced on the flat product, in particular the thin metal sheet according to the invention, defines preferably predominantly closed empty volumes. In this case, the surface texture is preferably formed so as to be substantially or approximately symmetrical or axially symmetrical.

Due to their special characteristic profile, flat products according to the invention can be used particularly for producing components which are to be provided with a layer of paint. This applies in particular if the flat products according to the invention are produced from steel and in particular are provided with an anti-corrosion coating, for example a zinc coating. Such a steel sheet can be coated for example with a zinc or zinc magnesium coating. However, the criteria specified according to the invention can also apply to flat products which are made of another metal.

Flat products according to the invention are suitable in particular for producing car body parts. After the forming thereof, these can also be provided, in shortened painting processes, with a paint coating which meets the highest demands on its external appearance on each component, in particular without applying a filler layer ("fillerless painting"). The surface texture specified according to the invention is so fine that visually and technically perfect coating results are achieved, even when a paint structure which is considerably simplified by comparison with the prior art is used.

The roll according to the invention has a deterministic surface texture which has a plurality of overlapping dimples which are arranged such that they delimit I-shaped, double-I-shaped, H-shaped, cross-shaped, C-shaped or X-shaped material textures in the surface of the roller, wherein the surface texture of the roll measured in the direction of the roll axis is characterised by a peak count RPc in the range of from 80 to 180 1/cm, an arithmetic mean roughness Ra in the range of from 1.0 µm, in particular 1.5 µm, preferably 2.5 µm to 3.5 µm and an arithmetic mean waviness Wsa in the range of from 0.08 to 1.0 µm.

In addition, the invention provides a method which allows the reliable production of metal flat products which can be formed better and painted more easily.

The invention is based on the knowledge that, taking into consideration the criteria specified according to the invention, a metal flat product can be provided according to plan with such a fine, substantially deterministic surface texture that, after typical automotive painting, it can hardly be visually perceived, if at all.

In particular, the present invention is based on the knowledge that the roll which is particularly suitable for producing a flat product according to the invention can advantageously be textured by means of a short-pulse laser (or short-pulse-laser method), in particular an ultra-short-pulse laser. The roll is produced for example from a steel material, preferably from a conventional cold-roll steel having a chromium content of up to 3%.

A suitable short-pulse laser (pulse fibre laser) has for example a pulse repetition frequency of approximately 100 kHz with a wavelength of approximately 1070 nm. The pulse duration is approximately 1 µs. The average power of the laser for producing the roll texturing according to the invention lies for example in the range of from 15 to 100 W, preferably in the range of from 20 to 70 W. The roll can still be ground smooth (superfinished) and optionally hard-chrome plated after the laser texturing. The surface of the roll is characterised in that the dimples have no substantial raised regions such as occur by comparison in the EDT method. The shorter the laser pulse (e.g. ps laser), the smaller the raised region is.

The depth of the dimples which are introduced into the roll surface preferably lies in the range of from 6 to 14 µm, more preferably in the range of from 8 to 13 µm. The average diameter of the dimples is approximately 20 to 80 µm, preferably approximately 20 to 40 µm, and more preferably approximately 22 to 35 µm.

Using the roll according to the invention or the method described here for texturing the surface thereof, the roughness characteristic values Ra, RPc (according to DIN EN 10049) and the long-waviness Wsa (what is known as "orange peel" having wavelength ranges of approximately 1-5 mm, cf. STAHL-EISEN-Prütblätter (SEP) [STEEL and IRON test sheets] 1941, 1st edition, May 2012) are set defined independently of one another.

BRIEF DESCRIPTION OF THE DRAWINGS

The invention is described in greater detail below with reference to drawings showing a plurality of embodiments, in which:

FIG. 1 is a schematic diagram of the texturing of a skin-pass roll by means of a pulsed laser (short-pulse laser);

FIGS. 2 to 4 are schematic representations of the laser beam effect or interactions on a material portion of a roll;

FIG. 6 is a schematic representation of a dimple texture of a skin-pass roll according to the invention, according to a first embodiment;

FIGS. 7 to 9 are schematic representations of various additional dimple textures of a skin-pass roll according to the invention, according to additional embodiments;

DESCRIPTION OF THE INVENTION

Figure 4:
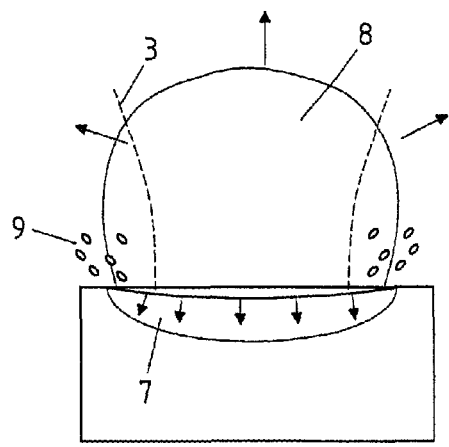

The surface textures according to the invention having a deterministic distribution of the design features (texture features) are produced using a roll-texturing method which uses a pulsed laser, preferably a short-pulse or ultra-short-pulse laser, for removing material from the surface of a rotating roll.

For this purpose, the roll 1 to be engraved is rotated in a rotation device. Whilst the roll rapidly rotates, a focusing optics 2, which focuses the laser beam on the surface of the roll, moves transversely at a relatively low speed in the direction of the roll axis. The laser beam thus depicts a helical path on the roll surface (FIG. 1).

During a pulse duration of approximately 1 µs, the laser beam 3 penetrates up to a certain depth into the material 4 of the roll 1. The material 4 or surface material of the roll 1 consists of free conduction band electrons 5 and positive metal ions 6 (FIG. 2).

The electrons 5 are accelerated by the electromagnetic field of the laser beam 3 and finally, during the interaction time, transfer their kinetic energy to the metal ions 6. Said ions are thereby made to vibrate and transfer the vibration energy to adjacent metal ions which are located outside the pure interaction zone between the laser radiation and the material of the roll (FIG. 3). In this way, heat is generated in the irradiated roll material 4. By supplying additional laser energy during the pulse time (FIG. 4), the material is melted. Finally, the evaporation temperature is reached, and some of the molten mass 7 evaporates. The metal vapour cloud 8 forming above the molten mass 7 quickly expands, the recoil effect causing an expulsion of the remaining molten mass in the form of molten spatters 9. The short-pulse laser method is characterised by a relatively large volume of material removed per pulse.

By selecting the parameters pulse frequency, pulse energy, distance between the tracks on the rotating roll surface, laser point of impact diameter (spot diameter), laser intensity profile and/or speed of the roll, the distribution and the geometry of the dimples on the roll surface are determined. By overlapping individual dimples, valley-shaped, connected regions are engraved or produced.

For the deterministic texture variants shown by way of example in FIGS. 6 to 9, the rapid, continuous sequence of the laser pulses was interrupted in a selective manner. The interruption of the laser pulses was carried out by means of a fast optical switch, an AOM (acousto-optic modulator) 10 (cf. FIG. 1). By rapidly switching the AOM 10 on and off, individual laser pulses were thus either deterministically projected onto the roll surface or deflected onto a cold trap 11 and destroyed there.

The laser used for this purpose (pulse fibre laser) had a maximum average power of 500 W and a pulse repetition frequency of approximately 100 kHz with a wavelength of approximately 1070 nm. The pulse duration should be no more than 1.5 µs. In the tests carried out, it was for example approximately 1 µs.

After passing the AOM 10, the laser beam 3 was conducted to the focusing optics 2 by means of an optical fibre cable 12. The arrow 13 denotes the direction of movement of the focusing optics 2.

The form of the textures was transmitted in an image-processing program provided specifically for this purpose. This program made it possible for the roll speed and the feed speed of the axial axis of the focusing optics 2 to be determined on the basis of the pulse sequence frequency (100 kHz) and for the AOM 10 to be controlled such that the density of the dimples and the deterministic distribution thereof were produced according to the texture and design specifications.

Figure 5:
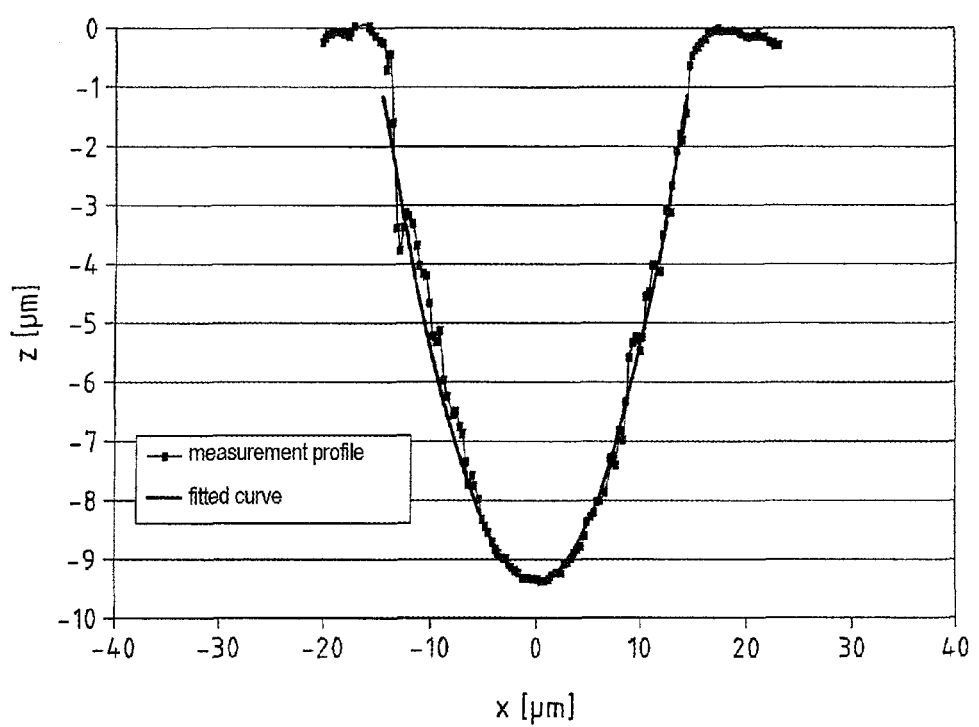
FIG. 5 shows a dimple profile, produced by means of a laser beam intensity profile.

The geometry of the individual dimples, which was also specified (diameter, depth and flank angle) was achieved by optimising the parameters pulse energy and spot diameter, and by a special modulation of the laser beam intensity profile (Gaussian profile) (FIG. 5). Alternatively or in addition to the Gaussian profile, the top-hat profile, which is familiar to a person skilled in the art, can also be used for the modulation. The laser craters (dimples) which are produced on the roll surface have a corresponding Gaussian profile. The flank angle or the maximum flank angle of the dimples is greater than 45°, preferably greater than 60°, and more preferably greater than 70°. The dimples thus have a steep flank angle.

FIG. 6 shows a detail of the texture to be produced on the surface of the roll, for example a skin-pass roll, having a diameter of 440 mm. In track 1, which is oriented substantially parallel to the circumference of the roll, said texture has a density of 42 dimples/mm, which are lined up with no gaps and an overlap of for example 1 µm. In order to achieve this density, a circumferential speed of 2.35 m/s is required for a pulse frequency of the laser of 100 kHz, which corresponds to a rotation speed of the roll of 1.7 s$^{-1}$. In the tracks 2 and 3, which are oriented substantially parallel to the circumference of the roll, dimples are omitted at the appropriate positions by power modulation of the laser beam by means of an AOM. In track 2, 23 dimples/mm are missing and in track 3, 9 dimples/mm are missing by comparison with the track 1. The modulation of the AOM and also the triggering of the laser pulses have to be synchronised with the moved axes, i.e. with the position of the angular encoder on the roll rotation drive and with the axial axis of the focusing optics, in order to produce a deterministic grid in a precise location, said grid having specified distances between the dimples in the direction of both axes. The distance between adjacent tracks in this example is 23 µm, and the axial speed of the focusing optics is 39 µm/s. Additional parameters were:

Average laser power: approximately 40 W
Pulse energy: approximately 0.4 mJ
Diameter of the individual craters: approximately 25 µm
Depth of the individual craters: approximately 7 µm.

Flat products were skin-passed with a corresponding roll. The flat products were finely annealed cold rolled strip, for example of the grades of IF and/or BH steels. A DC 06 (IF steel) having a thickness of 0.7 mm was textured at a rolling speed of 145 m/min, a specific rolling force, based on the width of the strip, of 1.1 kN/mm and a skin-pass degree of 0.5%. In another example, an HC 180 B (BH steel) having a thickness of 0.7 mm was textured at a rolling speed of 140 m/min, a specific rolling force, based on the width of the strip, of 6 kN/mm and a skin-pass degree of 1.4%. The cold rolled strips were subsequently electrolytically galvanised. Similar tests were also carried out using hot dip galvanised thin metal sheets.

With corresponding or similar parameters, the textures shown in FIGS. 7 to 9 can also be generated on the roll surface.

The surface portion of the surface texture of a roll shown schematically in FIG. 6 has dimples which are lined up and overlap, and are arranged such that they delimit a plurality of double-I-shaped material textures in the roll surface. In addition, the double-I-shaped material textures are arranged relative to one another in a chessboard pattern. The lined up, overlapping dimples form open empty volumes on the roll surface. The roll can also be ground smooth and optionally hard-chrome plated after the laser texturing.

The roll surface texture according to FIG. 6, measured in the direction of the roll axis, lastly has a peak count RPc in the range of from approximately 140 to 160 1/cm, an arithmetic mean roughness Ra in the range of from 2.5 to 2.8 µm, and an arithmetic mean waviness Wsa in the range of from 0.1 to 0.2 µm. The standard deviation (a) of the peak and valley levels (flat regions) of the roll surface is approximately 0.6 µm and 2 µm respectively. The percentage of smoothness (non-textured surface) is approximately 25%.

The flat products which are skin-passed by such a roll, in particular thin metal sheets, then have a textured surface which is characterised by a deterministic double-I texture having predominantly closed empty volumes. Studies of thin metal sheets according to the invention which have been produced in this way have shown that said metal sheets have the following functional characteristics by comparison with thin metal sheets from the prior art, in particular those which were produced by means of rolls which were textured by EDT: improved paint appearance, low abrasion during the forming process (cf. FIG. 13), very low coefficients of friction (cf. FIG. 12), very low and late (shifted towards high surface pressures) tendency for the slip-stick effect (cf. FIG. 12), very good formability properties in the case of adapted oiling volume, in particular in the case of deep-drawing strains (cf. FIG. 15), obtaining the closed texture even in the case of high forming forces.

Figure 10:
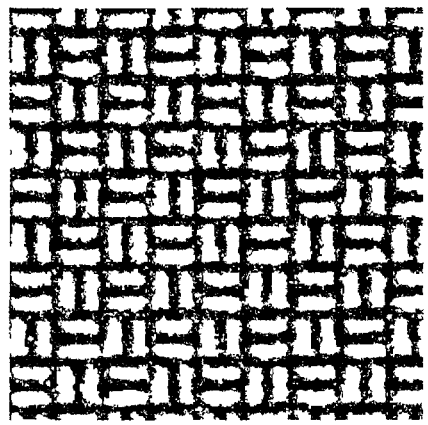
FIGS. 10 and 11 show portions of surface textures of flat products according to the invention.
Figure 12:
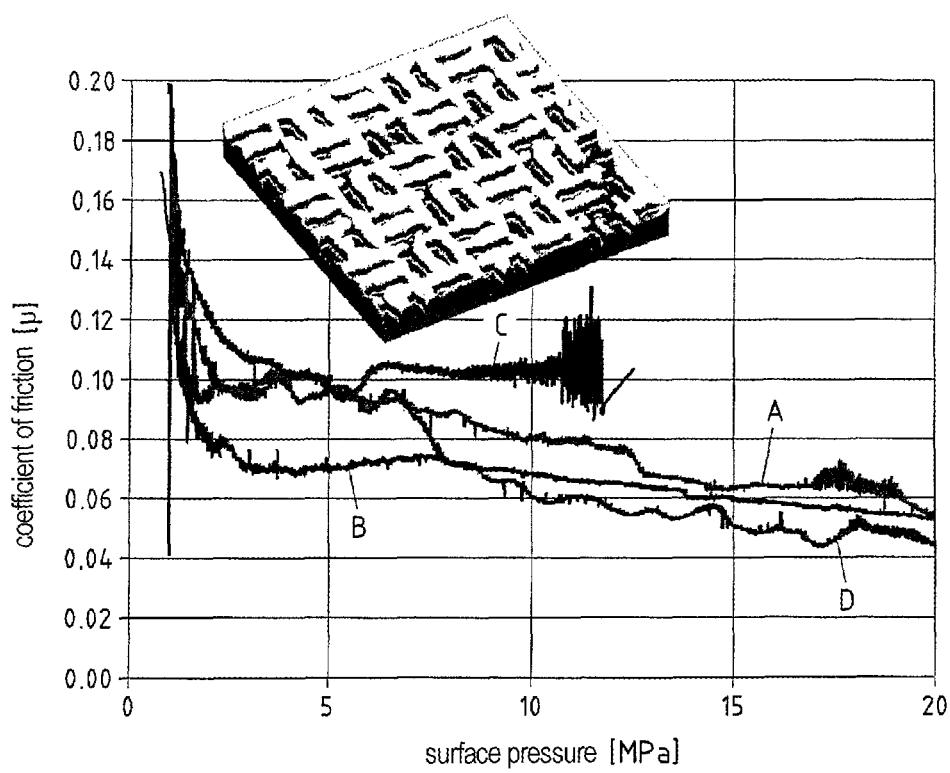
FIG. 12 shows the formability of flat products according to the invention in the case of various oil coatings.
Figure 15:
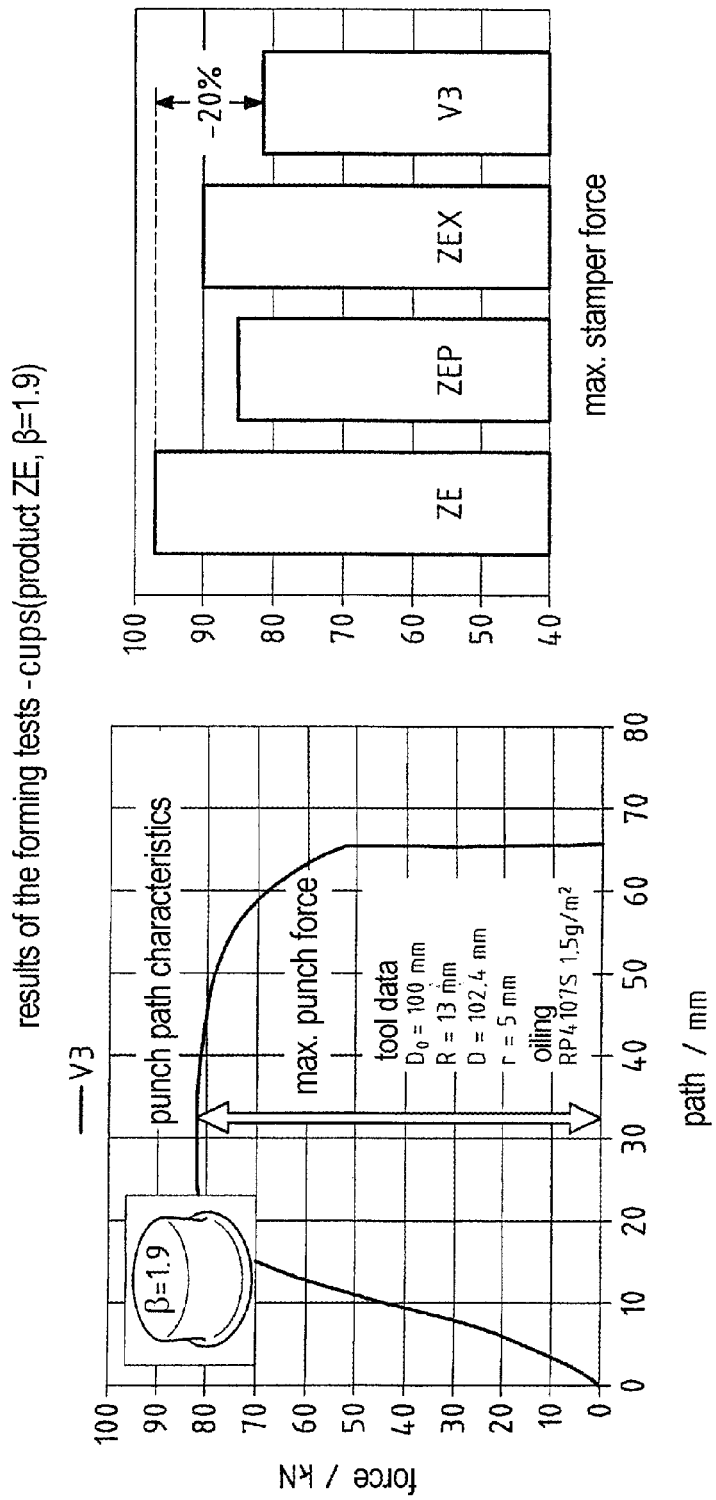
FIG. 15 is a comparison of results relating to various surface-treated thin metal sheets which have been subjected to a forming test according to FIG. 14.

In FIG. 12, measurement results of the coefficient of friction for electrolytically galvanised thin metal sheets which are textured according to the invention and have various steel grades are shown with different oil coatings depending on the surface pressure, said galvanised thin metal sheets obtaining a double-I-texture according to FIG. 10 (denoted by V3 in FIG. 15). The measurement curve A relates to a galvanised IF steel thin metal sheet having an oil coating of 1.5 g/m$^2$; the measurement curve B relates to a galvanised IF steel thin metal sheet having an oil coating of 3 g/m$^2$; the measurement curve C relates to a galvanised BH steel thin metal sheet having an oil coating of 1.5 g/m$^2$; and the measurement curve D relates to a galvanised BH steel thin metal sheet having an oil coating of 3 g/m$^2$.

Figure 13:
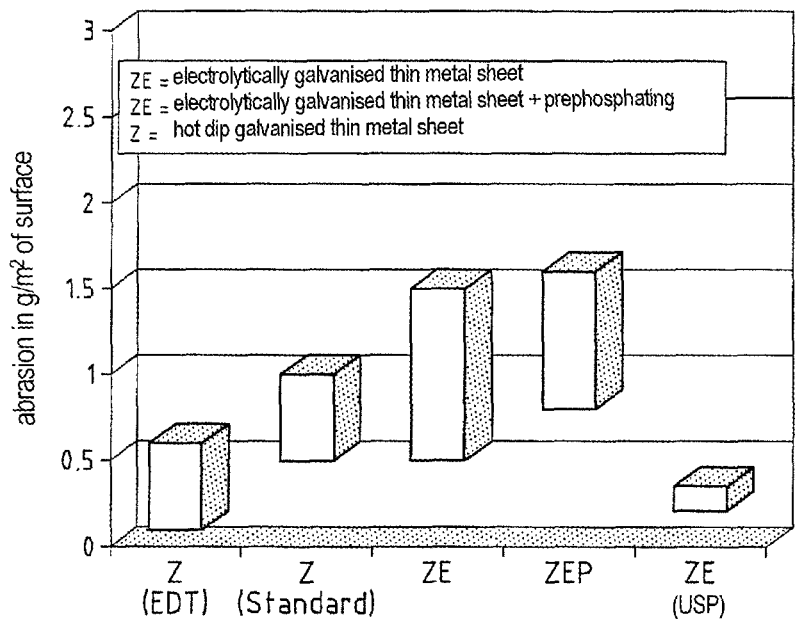
FIG. 13 shows the abrasion resistance of various surface-treated thin metal sheets.

In FIG. 13, the abrasion characteristics of surface-finished thin metal sheets is shown. The abrasion values were determined by strip-drawing tests using flat jaw tools. It should be recognised that a thin metal sheet which is textured by a roll which has been textured by EDT, denoted by "EDT" in FIG. 13, is characterised by low abrasion. However, it can also be seen in FIG. 13 that an electrolytically galvanised thin metal sheet, which was skin-passed according to the invention by means of a roll which was textured by the application of the ultra-short-pulse laser method (USP), is characterised by very low abrasion of approximately 0.2 g/m², which is even lower than in the case of the thin metal sheet "EDT".

Figure 14:
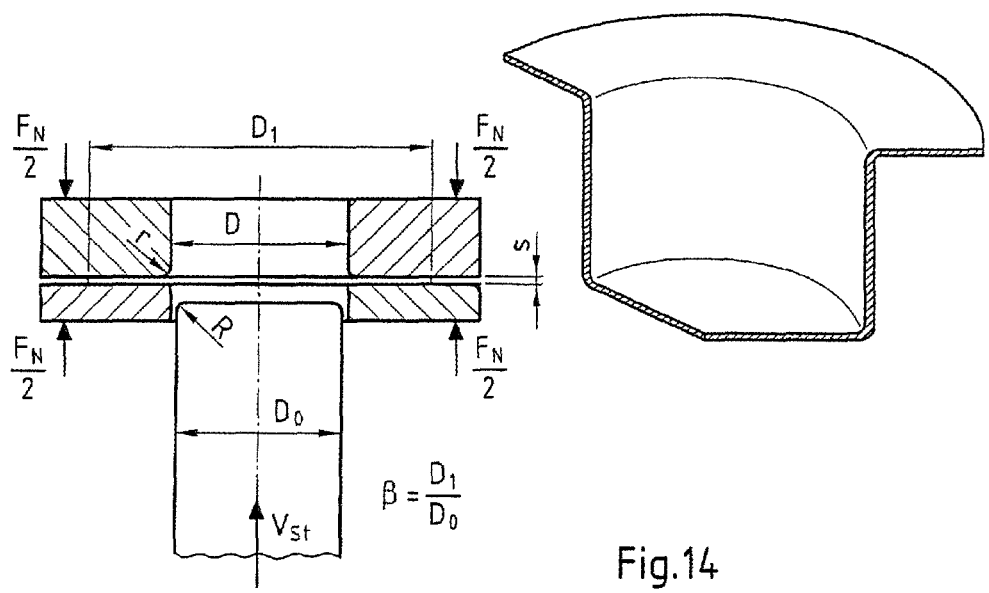
FIG. 14 is a schematic sketch of a forming test ("cup test")

In order to characterise the surfaces of the thin metal sheets which are textured according to the invention, in addition to the strip-drawing tests using flat jaw tools, deep-drawing tests were also carried out using a round punch (cf. FIGS. 14 and 15; "cup test"). As an assessment parameter, the measured punch force was assessed in each case at a clearly defined hold-down force. The tests were carried out with various oil coatings (oilings).

When forming a round cup, very high surface pressures occur locally in the region of the drawing radii which cannot be measured in the conventional strip-drawing test. The friction portion of the total punch force or punch activity in the case of the round cup is up to ⅓. The diameter Do of the punch was approximately 100 mm. The punch had a drawing radius R of 13 mm, whereas the drawing radius r of the matrix was 5 mm (FIGS. 14 and 15).

Since, in the tests, the same base material was used with different surface textures, the force curves recorded allow a direct comparison of the tribological properties of the different topographies. For the forming process, a lower friction portion means that less force has to be transferred via the edge of the round cup or component and increases the cracking limits when the drawing ratio is kept constant. The tests have shown that the surface texture V3 according to the invention (according to FIG. 10), which has a high proportion of closed empty volumes, shows a clear reduction in the level of punch force (cf. FIG. 15).

The surface portion, which is shown schematically in FIG. 7, of a textured roll according to the invention in turn has dimples which are lined up and overlap. By contrast with the embodiment shown in FIG. 6, in the embodiment according to FIG. 7, the laser craters shown as dashed lines in FIG. 6 have been omitted, and therefore the "double-I islands of material" are interconnected. The overlapping dimples are thus arranged in this case such that they delimit a plurality of H-shaped material textures in the roll surface. The H-shaped material textures are also arranged relative to one another in a chessboard pattern, the overlapping dimples forming open empty volumes. A surface portion of a thin metal sheet, which has been textured by means of a roll surface texture according to FIG. 7, is shown in FIG. 11.

The roll surface texture according to FIG. 7, which is measured in the direction of the roll axis, has a peak count RPc in the range of approximately 145 1/cm, an arithmetic mean roughness Ra in the range of from 2.6 to 2.7 μm and an arithmetic mean waviness Wsa in the range of from 0.1 to 0.2 μm. The standard deviation (a) of the peak and valley levels (flat regions) of the roll surface is approximately 0.5 μm and 1.7 μm respectively. The percentage of smoothness (non-textured surface) is approximately 38%.

Figure 11:
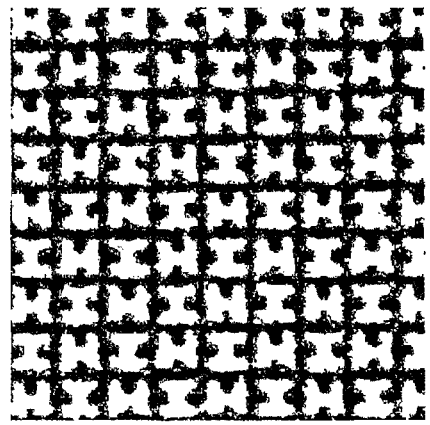

Thin metal sheets having a surface texture according to FIGS. 10 and 11 have the following functional characteristics: improved paint appearance, low abrasion in the forming process, low coefficients of friction, low tendency for the slip-stick effect, good formability properties in the case of adapted oiling volume, obtaining the closed texture even in the case of high forming forces.

FIGS. 8 and 9 show additional embodiments of roller surfaces textured according to the invention. In the texture according to FIG. 8, the dimples which are lined up and overlap are arranged such that they delimit I-shaped material textures in the roll surface which are arranged relative to one another in a herringbone pattern. The line textures of the dimples which are lined up are thus interrupted in this case, which is marked in FIG. 8 in the upper line texture by an X.

In the texture according to FIG. 9, the dimples which are lined up and overlap are arranged such that they delimit cross-shaped material textures in the roll surface. The line textures of the lined-up dimples are also interrupted in this case, which is marked in the lower line texture by two Xs.

Essentially, by changing the laser pulse energy or the skin-pass degree, the arithmetic mean roughness Ra of the roller surface textures and the resulting thin metal sheet surface textures can be increased or decreased.

The design of the present invention is not restricted to the embodiments shown in the drawings. Rather, the invention includes additional variants. Therefore for example the lined-up, overlapping dimples (laser craters) can also be arranged such that they delimit C-shaped or X-shaped material textures in the roll surface.

The invention claimed is:

1. A flat product made of a metal material having a deterministic surface texture, wherein the surface texture has a plurality of discontinuous depressions which have a depth in the range of from 2 to 14 μm, the depressions are H shaped, cross-shaped, C-shaped or X-shaped and each depression of the plurality of depressions is surrounded by raised portions of the surface area and separated from each of the other depressions of the plurality of depressions by the raised portions of the surface area, and the surface texture has a peak count RPc in the range of from 45 to 180 1/cm at a band width of +0.5 μm to −0.5 μm, an arithmetic mean roughness Ra in the range of from 0.3 to 3.6 μm and an arithmetic mean waviness Wsa in the range of from 0.05 to 0.65 μm.

2. The flat product according to claim 1, wherein the arithmetic mean roughness Ra of the surface texture lies in the range of from 1.0 to 2.5 μm.

3. The flat product according to claim 1, wherein the surface texture has a plurality of depressions which have a depth in the range of from 3 to 13 μm.

4. The flat product according to claim 1, wherein the depressions are arranged relative to one another in a repeating pattern.

5. The flat product according to claim 1, wherein said product is a steel sheet or strip.

6. The flat product according to claim 1, wherein the flat product is provided with an anti-corrosion coating.

7. The flat product according to claim 6, wherein the anti-corrosion coating is a zinc-based coating.

8. A component produced from a flat product formed according to claim 1, wherein the component is coated with a paint layer.

9. The flat product according to claim 1, wherein the H-shaped depressions are arranged relative to one another in a chessboard pattern.

10. A flat product made of a metal material having a deterministic surface texture, wherein the surface texture has a plurality of discontinuous depressions which have a depth in the range of from 2 to 14 μm, the depressions are I-shaped and each depression of the plurality of depressions is surrounded by raised portions of the surface area and separated from each of the other depressions of the plurality of depressions by the raised portions of the surface area, and the surface texture has a peak count RPc in the range of from 45 to 180 1/cm at a band width of +0.5 μm to −0.5 μm, an arithmetic mean roughness Ra in the range of from 0.3 to 3.6 μm and an arithmetic mean waviness Wsa in the range of from 0.05 to 0.65 μm, wherein each of the I-shaped depressions has opposing longitudinal sides and opposing transverse sides, a length of the longitudinal sides is greater than a length of the transverse sides, the I-shaped depressions are arranged such that they define a plurality of pairs of I-shaped depressions consisting of two directly adjacent I-shaped depressions whose longitudinal sides are separated by a raised area, the longitudinal sides of the two I-shaped depressions in each pair of I-shaped depressions extend parallel to one another, and the transverse sides of the two I-shaped depressions in each pair of I-shaped depressions are aligned with one another.

11. The flat product according to claim 10, wherein the arithmetic mean roughness Ra of the surface texture lies in the range of from 1.0 to 2.5 µm.

12. The flat product according to claim 10, wherein the surface texture has a plurality of depressions which have a depth in the range of from 3 to 13 µm.

13. The flat product according to claim 10, wherein the depressions are arranged relative to one another in a repeating pattern.

14. The flat product according to claim 10, wherein the pairs consisting of I-shaped depressions are arranged relative to one another in a chessboard pattern.

15. The flat product according to claim 10, wherein said product is a steel sheet or strip.

16. The flat product according to claim 10, wherein the flat product is provided with an anti-corrosion coating.

17. The flat product according to claim 16, wherein the anti-corrosion coating is a zinc-based coating.

18. A component produced from a flat product formed according to claim 10, wherein the component is coated with a paint layer.

* * * * *